United States Patent [19]
Luthy

[11] 3,713,746
[45] Jan. 30, 1973

[54] GUIDING APPARATUS FOR CONTROLLING RECTILINEARLY MOVABLE PART OF A MACHINE TOOL

[75] Inventor: Walter Luthy, 8050 Zurich, Switzerland

[73] Assignee: Werkzeugmaschinenfabrik Oerlikon-Buhrle AG, Zurich, Switzerland

[22] Filed: Dec. 17, 1970

[21] Appl. No.: 99,020

[30] Foreign Application Priority Data

Dec. 24, 1969 Switzerland...................19196/69

[52] U.S. Cl. ....................408/8, 408/16, 33/46 AT
[51] Int. Cl. ..............................................B23b 23/00
[58] Field of Search............33/46 AT; 408/13, 16, 8; 308/3 A

[56] References Cited

UNITED STATES PATENTS

| | | | |
|---|---|---|---|
| 2,703,505 | 3/1955 | Senn | 33/46 AT |
| 2,692,527 | 10/1954 | Wetzel et al. | 33/46 AT |
| 3,600,987 | 8/1972 | Kvasnicka | 33/46 AT |
| 3,635,108 | 1/1972 | Prince | 82/1 |

*Primary Examiner*—Francis S. Husar
*Attorney*—Wenderoth, Lind & Ponack

[57] ABSTRACT

Guiding apparatus for controlling the movement of a rectilinear movable part in a machine tool. The part is guided by reference to a stationary beam of light. Part is mounted in sliding contact bearings in guideway. Disposition of the part controlled by electro-hydraulic circuit which operates on the bearings in response to changes in position of the part relative to the stationary light beam.

8 Claims, 10 Drawing Figures

WALTER LUTHY, Inventor

By Wendworth Lind & Ponack
Attorneys

WALTER LUTHY, Inventor

By Denderoth Lind & Ponack
Attorneys

WALTER LUTHY, Inventor

By *Wenderoth, Lind & Ponack*
Attorneys

WALTER LUTHY, Inventor

GUIDING APPARATUS FOR CONTROLLING RECTILINEARLY MOVABLE PART OF A MACHINE TOOL

This invention relates to a machine tool a guiding apparatus for a rectilinearly movable part of controlling machine tool.

It is conventional to move for controlling instance a slide in rectilinear guide ways in a lathe. If the precision of this movement with regard to rectilinearity is required to be very high the structure comprising the ways must be extremely rigid, the ways themselves must be very precisely machined and they must be made of high quality abrasion-resistant material to prevent wear that would impair the precision of rectilinearity. Finally there should be a minimum of clearance between the sliding surfaces of the ways and the slide and the surfaces themselves should be as rigid as possible to ensure rectilinear motion of the slide even when the forces acting on the slide vary and act in different directions.

Every further increase in precision of such rectilinear guide ways has proved to be more and more difficult and expensive to achieve. For instance, the difficulties of making a structure more rigid, of machining ways even more precisely, of using even more expensive material for making the ways and of still further raising the rigidity of the sliding surfaces presents ever increasing difficulties.

A machine tool according to the invention includes a part movable in a rectilinear path, in which said part is guided by reference to a stationary beam of light.

The invention is illustrated by way of example in the accompanying drawings in which:

FIG. 2b is a section on the line IIb in FIG. 2a;

FIG. 2c is a section on the line IIc in FIG. 2a;

Figure 1:
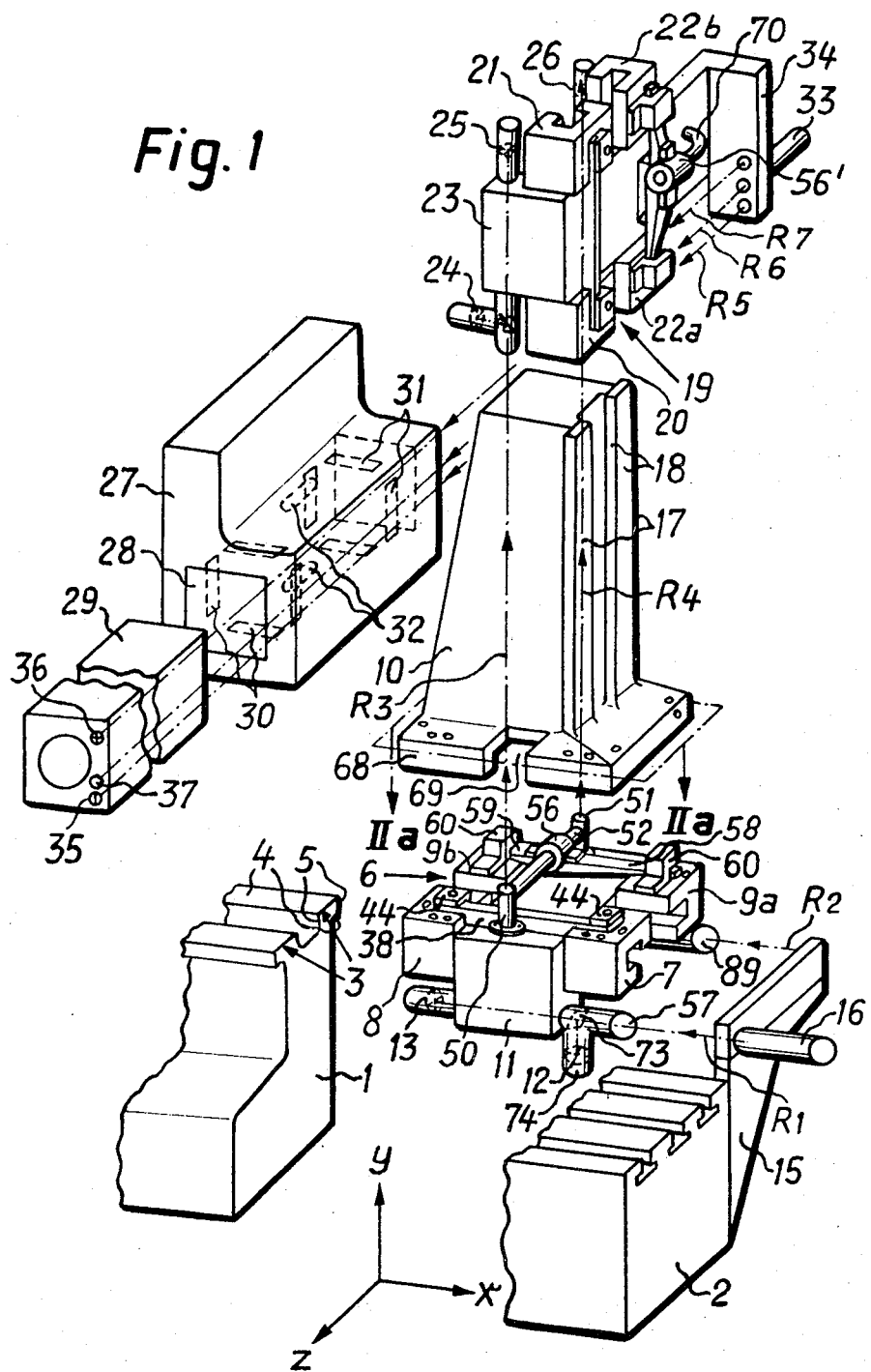
FIG. 1 is an exploded view of parts of a horizontal drilling machine according to the invention.

With reference to FIG. 1 a mounting base 2 for a workpiece is associated in a manner not shown in detail with a machine bed 1. The machine bed 1 has two parallel guideways 3 in x-direction which include top and bottom guiding faces 4 and side guiding faces 5. A horizontal slide 6 comprising four sliding shoes 7, 8, 9a, 9b disposed in the x–z co-ordinate plane is slidable horizontally in the guideways 3. The sliding shoes 7, 8, 9a, 9b engage the guideways and are all vertically and some also horizontally adjustable as will be later described with reference to FIG. 5b and 6b. In a preferred arrangement the sliding shoes 7, 8 are adjustable in both the vertical and horizontal directions, whereas the sliding shoes 9a, 9b are vertically adjustably. The sliding shoes 9a, 9b are adjusted synchronously and they therefore move as a pair of shoes integrally connected. Mounted on the sliding shoes 7, 8, 9a, 9b is a column 10 of the drilling machine. Slide 6 and column 10 constitute a first carriage.

Figure 2A:
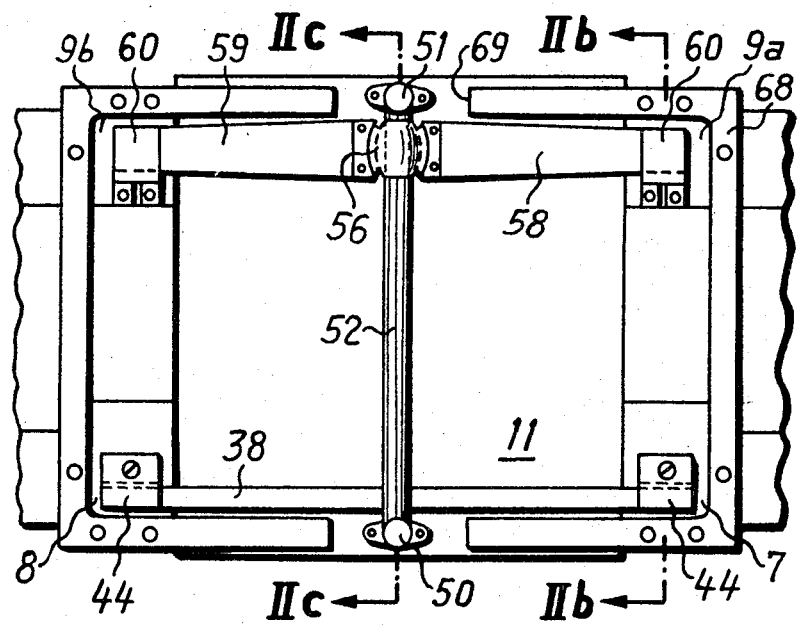
FIG. 2a is a section on the line IIa in FIG. 1.
Figure 2B:
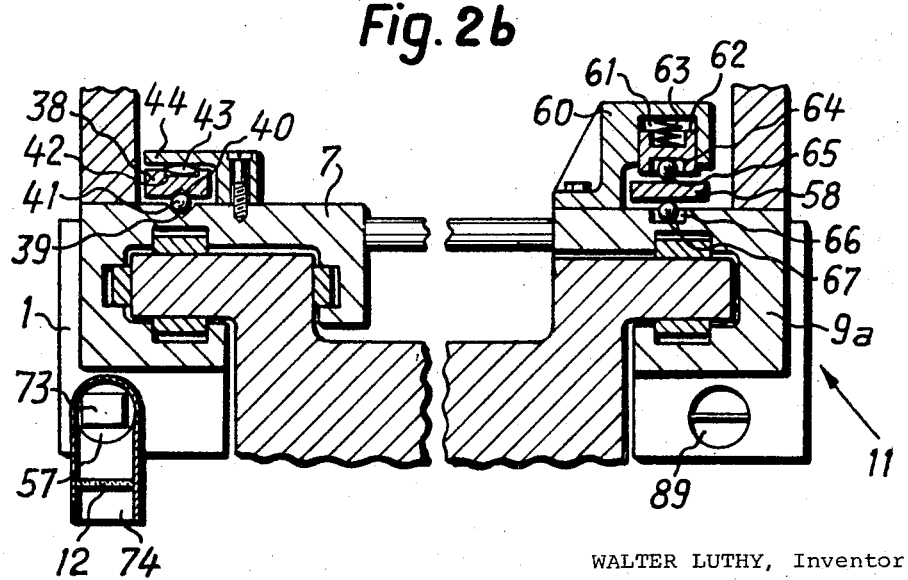
Figure 2C:
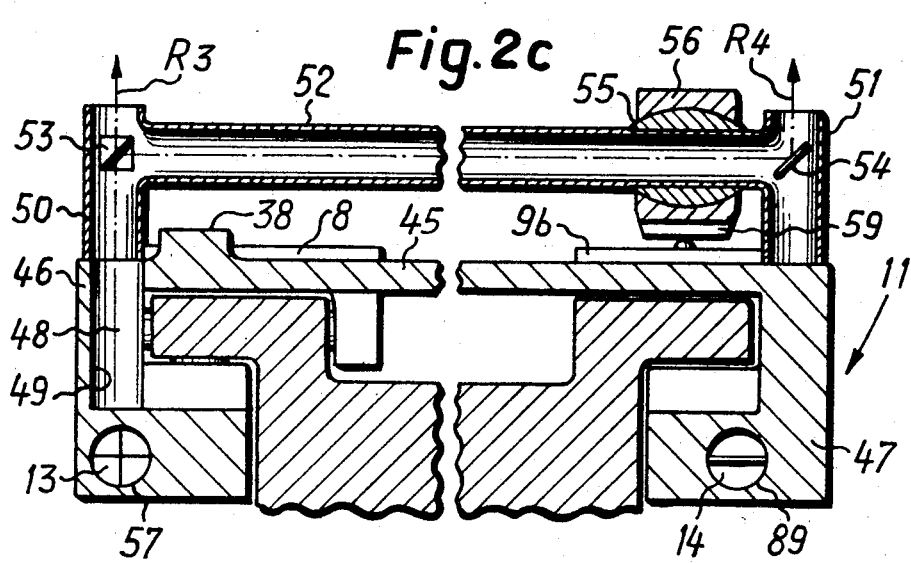

Located between the sliding shoes 7, 8, 9a, 9b is a detector flange 11 which is connected to the column 10 by a form of suspension illustrated in FIGS. 2a to 2c whereby it is relieved of all stresses but participates in the movements of the sliding shoes. The detector flange 11 supports two tubes 57, 89 which extend in the x-direction underneath the sliding shoes 7, 8 and 9a, 9b respectively. Under the sliding shoe 7 the tube 57 contains a beam splitter 73. The half beam which passes through the beam splitter 73 falls on a detector 13 located inside the tube 57 underneath the sliding shoe 8. The half beam that is reflected by the beam splitter falls on a detector 12 which is located in a Tee pipe 74 underneath the beam splitter 73. The Tee pipe 74 is normal to the tube 57. A third detector 14 (FIG. 3) is located inside the tube 89 midway between the two sliding shoes 9a, 9b. Bolted to a bracket 15 which is mounted on the mounting base 2 is a light source 16. The beam emitted by the light source 16 is divided into two coplanar beams R1, R2 by a deflecting and beam splitting device not shown in detail but disposed inside the bracket 15. The two tubes 57, 89 are axially aligned with the two beams R1 and R2.

A vertical slide 19 is movably mounted in guideways 17 which include guide surfaces 18 on the column 10. Similarly to the horizontal slide 6 the vertical slide 19 is provided with four sliding shoes 20, 21, 22a, 22b, a detector flange 23 and three detectors 24, 25, 26. The beam emitted by a light source contained in the detector flange 11 is divided by beam splitting and deflected into two beams R3 and R4 which are received by the detectors 24, 25, 26 and which define the y–z co-ordinate plane. Attached to the sliding shoes 20, 21, 22a, 22b is a cantilever arm 27. This cantilever arm 27 contains a square section hole 28 extending in the z-direction and containing a drill slide 29. This drill slide 29 is contained inside the cantilever arm 27 and located by front and rear end sliding contact bearings 30, 31 provided in all four side faces of the square section hole 28. The sliding contact bearings 30, 31 are adjustable to tilt the end face of the drill slide 29. Moreover, a torque about its horizontal axis (z-axis) can also be applied to the drill slide 29. For this purpose the center of the cantilever arm 27 contains two sliding contact bearings 32 laterally offset from the center in two faces on opposite sides. Slide 19 and arm 27 constitute a second carriage.

For locating the end face of the drill slide 29 in the x–y co-ordinate plane by adjustment of the sliding contact bearings 30–32 another light source 33 is attached by a flange 34 to the detector flange 23. By beam splitting and deflection three parallel light beams R5, R6, R7 are produced. Two of these beams are received by detectors 35, 36 in the end face of the drill slide 29, whereas the third beam is reflected by a mirror 37 in the end face of the drill slide 29 and returned to a detector in the flange 34.

FIG. 1 and particularly FIGS. 2a, 2b and 2c illustrate the stress-free suspension of the detector flange 11 by means of the sliding shoes 7, 8, 9a, 9b. A rail 38 is attached to the detector flange 11. This rail 38 projects beyond both ends of the detector flange 11 in the x-co-ordinate direction and rests on the sliding shoes 7, 8. The shoes 7, 8 are formed on their upper faces with spherical indentations 39. These indentations 39 carry balls 41. The dimensions of the indentations 39 are such that the major part of the balls 41 rises above the surface of the sliding shoes 7, 8. The rail 38 has similar indentations 40 in its undersides and thus rests on the top of the balls 41. Above the indentations 40 the surface of the rail 38 contains recesses 42 containing Belleville springs 43. Angle brackets 44 bolted to the sliding shoes 7, 8 overlap the rail 38 and keep it in contact with the balls 41 by pressing down on the Belleville springs 43.

The detector flange 11 consists of a horizontal plate 45 and two sidewalls 46, 47 extending vertically downwards. The horizontal tubes 57, 89 are disposed inside the sidewalls 46, 47. In a recess 49 in the sidewall 46 is a light source 48. The beam emitted by the light source 48 is projected vertically upwards. A Tee tube 50 bolted to the plate 45 of the detector flange 11 is coaxial with the beam emitted by the light source 48. A corresponding Tee tube 51 is provided on the other side of the detector flange 11 above the sidewall 47. The two Tee tubes 50, 51 are interconnected by a transverse tube 52. At the elevational level of the transverse tube 52 the Tee tube 50 contains a beam splitter 53 whereas the Tee tube 51 contains a deflecting mirror 54. Consequently one half of the beam emitted by the light source 48 passes straight through the beam splitter 53 and forms a reference beam R3, whereas the other half of the beam is deflected at right angles by the beam splitter 53, passes through the transverse tube 52 and is reflected, again at right angles, by the deflecting mirror 54, so that it leaves the Tee tube 51 parallel to the reference beam R3 and forms a reference beam R4.

Above the pair of sliding shoes 9a, 9b on the outside of the transverse tube 52 is a spherical projection 55. This spherical projection 55 is engaged by a spherical socket 56 which is therefore universally deflectable. The spherical socket 56 is attached to two arms 58, 59 which extend from sliding shoe 9a to the shoe 9b. Angle brackets 60 extend over the arms 58, 59 and are mounted on the sliding shoes 9a, 9b. The angle brackets 60 each contain a recess 61 facing the arms 58, 59, respectively and a member 62 which is resiliently supported from the bottom of the recess 61 by a spring 63. The sides of the members 62 facing the arms 58, 59 respectively contain shallow depressions 64. Ball 65 rest in these shallow depressions and bear against the top of the arms 58, 59 respectively. The balls 65 are maintained in contact with the arms by the thrust of the springs 63 transmitted by the members 62. Coaxial with the said shallow depressions 64, the surfaces of the sliding shoes 9a, 9b are provided with similar shallow depressions 66. Between the arms 58, 59 respectively and the bottom of the shallow depressions 66 in each case is a ball 67.

In order to provide space for the above described suspension of the detector flange 11 the column 10 is formed at its base 68 with a peripheral angle flange which creates a cavity (FIG. 1). Gaps 69 are cut into opposite sides of the flange of base 68 to provide a passage for the Tee tubes 50, 51 and hence for the reference beams R3 and R4.

The suspension of the detector flange 23 from the sliding shoes 20, 21, 22a, 22b of the vertical slide 19 is in principle similar to that which has been described with reference to the horizontal slide. However, since the beam splitting system comprising the tubes 50–52 is absent, a bearing pin 70 is provided instead of the socket 56. For the accommodation of the suspension of the detector flange 23 a cavity is provided in the cantilever arm 27. This is not visible in FIG. 1.

Figure 3:
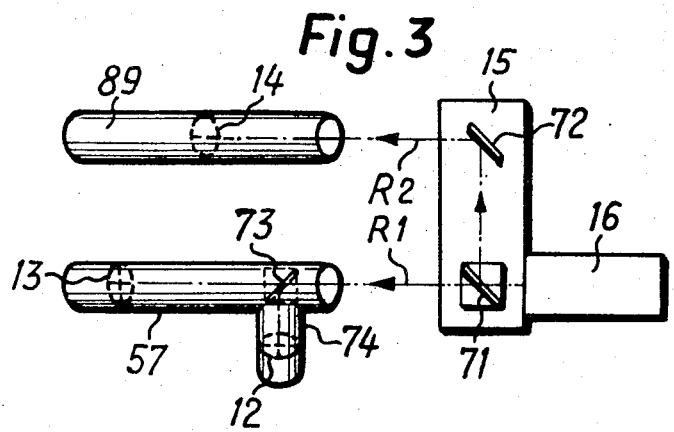
FIG. 3 is a representation of the path of the light beams defining an x–z co-ordinate plane.

With reference to FIG. 3 the beam emitted by the light source 16 is incident on a beam splitter 71 constituted by a semitransparent mirror interposed at an angle of 45° in the path of the beam. The half beam that is reflected by the beam splitter 71 is directed to a deflecting mirror 72 which reflects it through an angle of 90° so that it falls on the detector 14 in the tube 89 as a reference beam R2. The half beam R1 which passes through the beam splitter is incident on a second beam splitter 73 located inside the tube 57. The beam reflected by the beam splitter 73 falls on the detector 12 in the Tee tube 74, whereas the half beam that passes through the beam splitter 73 falls on the detector 13 inside the tube 57. The beam splitter 71 and the reflecting mirror 72 are disposed inside the bracket 15 to which the light source 16 is also attached. The arrangement described with reference to FIG. 5 serves for monitoring the position of the horizontal slide 6 in the x–z co-ordinate plane. The same kind of arrangement is provided for monitoring the position of the vertical slide in the y–z co-ordinate plane, the parts provided in and on the bracket 15, such as the light source, the beam splitter and the deflecting mirror being now disposed in or on the detector flange 11 (FIG. 2c).

Figure 4:
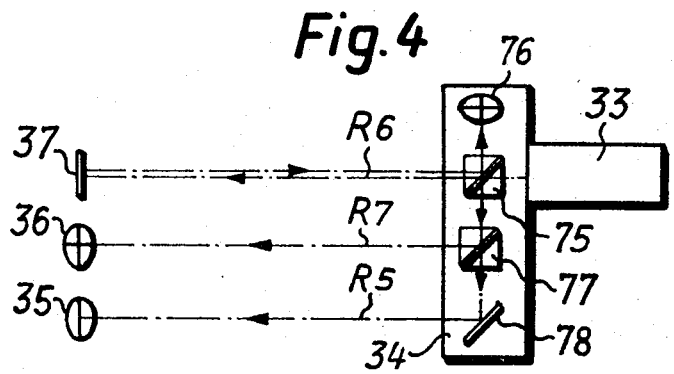
FIG. 4 is a representation of the path of the beams defining an x–y co-ordinate plane.

For monitoring the position of the end face of the drill slide 29 in the x–y co-ordinate plane the arrangement shown in FIG. 4 is provided. The light source 33 which is attached to the flange 34 directs its beam on a beam splitter 75. That part of a beam R6 which passes through the beam splitter 75 falls on a mirror 37 in the end face of the drill slide 29. It is thereby reflected backwards in the opposite direction and again falls on the beam splitter which reflects it at an angle of 90° into a detector 76. The other half of the split beam from the beam splitter 75 is deflected by a second beam splitter 77 which directs it towards a detector 36. On the other hand, the part of the beam that passes straight through the beam splitter 77 is reflected at a 45° mirror which directs it at right angles to form a third reference beam R5 to a detector 35. The detector 76, the two beam splitters 75, 77 and the deflecting mirror 78 are all disposed inside the flange 34. The two detectors 35, 36 and the mirror 37 are provided in the end face of the drill slide 29.

Figure 5B:
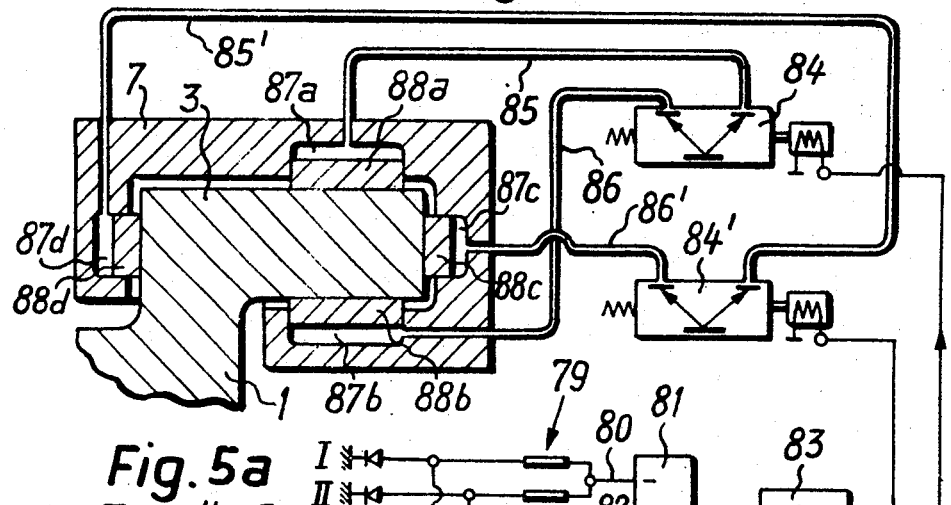
FIG. 5b is a cross section of a vertically and horizontally adjustable sliding shoe of the machine of FIG. 1 and of the electro-hydraulic circuit for adjusting the same.
Figure 5A:
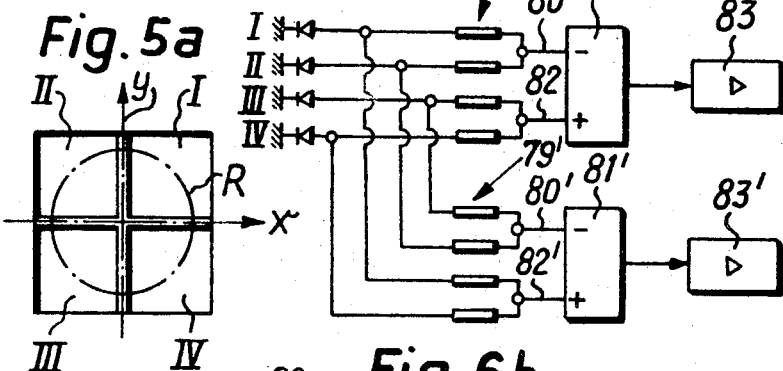
FIG. 5a is a light detector of the machine of FIG. 1 in section.

FIG. 5a shows a detector which comprises four photo-diodes I–IV disposed in four quadrants. The detector is thus able to detect deviations of the beam R both in the vertical and in the horizontal directions. With reference to FIG. 5b the two photo-diodes I and II in the upper half of the detector are connected through two similar evaluating resistors 79 to the negatively assessing input 80 of a difference amplifier 81. The two photo-diodes III and IV in the bottom half of the detector are similarly connected through two similar evaluating resistors 79 to the positively assessing input 82 of the difference amplifier 81. Hence a vertical displacement of the detector in relation to the beam R will give rise to a negative or positive signal in the output of the difference amplifier according to whether the illumination of the upper or lower half of the detector prevails, and this signal is used via a servo amplifier 83 to operate a servo valve 84. The servo valve 84 controls the admission of pressure oil through pipes 85 and 86 to a vertically adjustable sliding contact bearing. Such an adjustable sliding contact bearing is disclosed in our co-pending Patent application Ser. No. 65,489 where it is described in detail. For the vertical adjustment of the sliding contact bearing the sliding shoe 7 contains chambers 87a and 87b on the sides facing the guideways 3. These chambers contain bearing members 88a, 88b which are vertically movable and function as pistons. The chambers 87a, 87b are connected by the oil pipes 85, 86 to the servo valve 84. In order to permit the sliding shoe 7 to be also adjusted in a horizontal plane the sliding shoe 7 contains further chambers 87c, 87d containing horizontally movable bearing members 88c, 88d. These bearing members make contact with the guideway 3. The admission of pressurized oil to the chambers 87c, 87d and hence the horizontal displacement of the sliding shoe 7 is controlled by a servo valve 84' through pipes 85' and 86'. The servo valve 84' is operated by the output signal of a difference amplifier 81' and a servo amplifier 83'. For an evaluation of a horizontal displacement of the detector the photo-diodes II, III on the left hand side of the detector are connected by evaluating resistors 79' to the negatively assessing input 80' of the difference amplifier 81' so that in the presence of the stronger illumination by the light beam R on the left hand half of the detector a negative signal will appear in the output of the difference amplifier 81'. On the other hand, the photo-diodes I, IV on the right hand side of the detector are connected through like evaluating resistors 79' to the positively assessing input 82' of the difference amplifier 81' so that whenever the illumination by the beam R of the right hand half of the detector predominates the signal in the output of the difference amplifier will be positive.

Figure 6B:
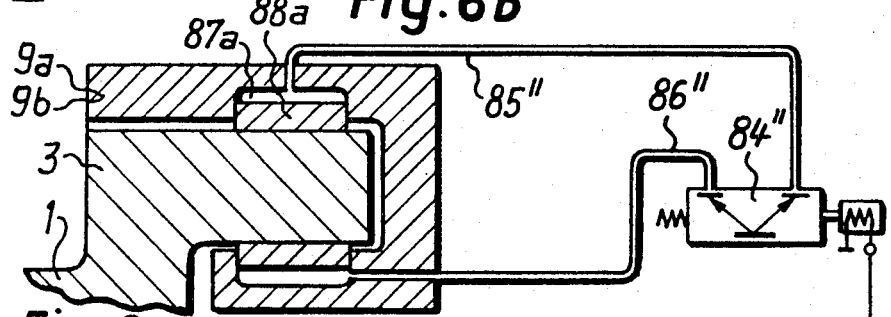
FIG. 6b is a cross section of a vertically adjustable sliding shoe of the machine of FIG. 1, and of the electro-hydraulic circuit for adjusting the same.
Figure 6A:
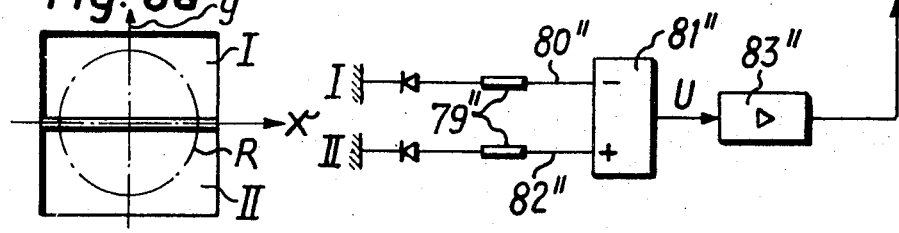
FIG. 6a is a section of another detector of the machine of FIG. 1.

FIG. 6a shows a detector for detecting movements in only one co-ordinate direction and this is therefore divided into two halves each formed by a photo-diode I respectively II. The illustrated detector serves for detecting a vertical displacement in relation to the reference light beam R.

In FIG. 6b the photo-diode I of the upper half of the detector is connected through an evaluating resistor 79'' to the negatively assessing input 80'' of a difference amplifier 81'' for the purpose of evaluating the signals generated by the photo-diodes I and II. Similarly the photo-diode II of the bottom half of the detector is connected through a corresponding evaluating resistor 79'' to the positively assessing input 82'' of the difference amplifier 81''. According to whether the illumination of the detector is greater in the upper or lower half a negative or positive signal will appear in the output of the difference amplifier 81''. Further amplified by a servo amplifier 83'' this signal functions to operate a servo valve 84'' in the one or other direction to admit more or less pressurized oil to the chambers, 87a, 87b through pressure pipes 85'', 86'' and thereby to raise or lower the sliding shoe 9a, 9b in the vertical direction as it moves between the bearing members 88a, 88b.

The manner in which the rectilinear guidance system of the machine tool functions is as follows:

The light beams R1 and R2 are both contained in the x-z coordinate plane. In the zero position of the horizontal slide 6, i.e. in a symmetrically loaded condition, assuming an ideally precise guideway 4, the beams R1, R2 will align with the detectors 12, 13, 14. If the guideways 4, 5 include irregularities or if the horizontal slide 6 is asymmetrically loaded, the sliding shoes 7, 8, 9a, 9b will yield to this irregularity or load. The movement of the sliding shoes 7, 8, 9a, 9b will be imparted to the detector flange 11 by reason of the nature of the suspension described with reference to FIG. 2a – 2c, and the detectors 12, 13, 14 attached to the flange will therefore participate in these movements.

Let it be assumed that the sliding shoe 7 moves downwards under the effect of a cutting thrust and there is a consequent deflection of the column 10 in the y-co-ordinate direction. The movement of the sliding shoe 7 is transmitted by the angle member 44, the Belleville spring 43 and the ball 41 to the track rail 38 and hence to the detector flange 11. The other end of the track rail 38 tilts about the ball 41 of the neighboring sliding shoe 8 without any force being transmitted to the sliding shoe 8 tending to change its position. The tilting motion of the detector flange 11 about the ball 41 on the sliding shoe 8 is accompanied by a deflection of the transverse tube 52 about its spherical projection 55 in the spherical socket 56. A tilting axis is thus established which passes through the ball 41 to the sliding shoe 8 and the center of the socket 56. When the detector flange 11 moves in this way the detector 12 will be asymmetrically illuminated.

The above described events also occur when the sliding shoe 8 is vertically displaced. In such a case the detector flange 11 tilts about an axis that passes through the ball 41 on the sliding shoe 7 and the center of the socket 56. Opposed vertical displacements of the sliding shoes 7 and 8 cause the detector flange 11 to tilt in the socket 56 about the transverse tube 52 as a hinge.

When the sliding shoes 9a, 9b which are jointly controlled and therefore behave like a single shoe move in the vertical the detector flange 11 tilts about the rail 38.

A horizontal movement of the sliding shoes 7, 8 is transmitted via the ball 41 and the rail 38 to the detector flange 11. The spherical projection 55 on the transverse tube 52 and the socket 56 transmit the movement of the detector flange 11 to the arms 58 and 59. The arms 58 and 59 can roll on the balls 65 and 67.

In all the above mentioned possible displacements of the detector flange 11 generated by motions of one or more of the sliding shoes, no forces are transmitted from one sliding shoe to the other by the interposed detector flange 11.

When, in course of the above described motions, one of the detectors 12, 13, 14 moves from the center of the associated beams R1, R2 then the difference amplifier 81 associated with the several photo-diodes of the detector will generate a signal, as will be understood from FIGS. 5b, 6b and the magnitude and sign of this signal will depend upon the magnitude and direction of the deviation of the detector from the center of the beam. The difference amplifier associated with the detector 12 must have a gain factor that is only half that of the difference amplifiers associated with the other detectors 13, 14 because the deviations from the reference beam R1 which is registers are twice as large owing to the reflection of the beam at the beam splitter 73. The output signal of the difference amplifier 81 through the servo amplifier 83 operates the servo valve 84 which in turn varies the supply of pressure oil to the corresponding sliding shoe in such a way that the latter is forced back into its former position in which the associated detector aligns with its beam. All the sliding shoes 7, 8, 9a, 9b are vertically adjustable. Two sliding shoes, for example the two shoes 7 and 8, are also horizontally adjustable. Accordingly the photodiodes of the detectors 12 and 13 associated with the sliding shoes 7 and 8 are divided into four quadrants (FIG. 5a) and the electrohydraulic control circuit corresponds to the control circuit shown in FIG. 5b for horizontal and vertical control by the sliding contact bearing. The detector 14 in FIG. 6a has only one upper and one lower photodiode and the electro-hydraulic control circuit corresponds to that illustrated in FIG. 6b for displacing the sliding shoes 9a, 9b in the vertical.

The vertical slide 19 corresponds to the horizontal slide 6 in construction and in the manner in which it functions. The detectors 24, 25, 26 are aligned with the beams R3 and R4 which are contained in the y–z co-ordinate plane. Detectors as shown in FIG. 5a and electro-hydraulic control circuits of the kind shown in FIG. 5b are associated with the sliding shoes 20 and 21. A detector as shown in FIG. 6a and an electro-hydraulic circuit as shown in FIG. 6b are associated with the sliding shoes 22a, 22b.

The drill slide 29 is maintained with its end face in the x–y co-ordinate plane as hereinafter described:

When the beam R7 fails to fall centrally on the detector 36 which is divided into four quadrants, each containing one photodiode, then the sliding bearings 30 are horizontally and vertically adjusted by electro-hydraulic control to keep the detector 36 precisely in the center of the beam R7. If the detector 35 consisting of two photo-diodes forming a left and a right hand half are asymmetrically illuminated by the beam R5, then the sliding bearing 32 is adjusted by a control circuit similar to that shown in FIG. 6b.

The sliding bearing 32 applies torque about the z-axis to the drill slide 29 and turns the slide until the illumination of the detector 35 by the beam R5 is again symmetrical.

When the end face of the drill slide 29 is tilted, the mirror 37 disposed in the end face will not reflect the beam R6 exactly so it is coincident with the incident beam. The reflected beam is deflected and this deflection brings about a response by the detector 76 (FIG. 4) which likewise consists of four photodiodes disposed in quadrants. An electro-hydraulic control circuit as shown in FIG. 5b associated with the detector 76 controls the sliding bearings 31 in such a way as to keep the end face of the drill slide 29 precisely in the x–y co-ordinate plane.

Since the beams and hence the planes they define remain absolutely invariant they provide a reference system for the actual positions of the slides which are kept in true register by the controllable sliding contact bearings. The resultant rigidity of action and the precision of the machine are remarkably good.

Suitable light sources are preferably lasers since these generate precise pencils of monochromatic and coherent light.

Moreover, one of the beams in each plane may be incidentally used for an interferometric determination of the distances traversed by the slides.

I claim:

1. An apparatus including a machine tool having a rectilinearly movable part and a guiding means for controlling the movement of said part, said apparatus comprising: a machine bed; a first carriage rectilinearly movable in a first plane along said machine bed; a first detector flange suspended from said first carriage; means for suspending said detector flange from said first carriage at three statically determined force-free points; a first light source means fixedly positioned on said machine bed for generating a first pair of parallel rays determining said first plane, said rays being parallel to the direction of rectilinear movement of said first carriage; a first plurality of detectors supported by said detector flange, said detectors symmetrically receiving said rays when the movement of said first carriage is in said direction and in said first plane, said detectors being operable to detect deviation of said movement of said first carriage from said direction and from said first plane; and first electro-hydraulic circuit means responsive to said deviation detected by said detectors to correct said deviation.

2. An apparatus as claimed in claim 1, further comprising a second carriage rectilinearly movable on said first carriage in a second plane perpendicular to said first plane; a second light source means fixedly positioned on said detector flange of said first carriage for generating a second pair of parallel rays determining said second plane, said second pair of rays being parallel to the direction of rectilinear movement of said second carriage; a second detector flange suspended from said second carriage; means for suspending said second detector flange from said second carriage at three statically determined, force-free points; a second plurality of detectors supported by said second detector flange, said second plurality of detectors symmetrically receiving said second pair of rays when the movement of said second carriage is in said direction of rectilinear movement thereof and in said second plane, said second plurality of detectors being operable to detect deviation of said movement of said second carriage from said direction and from said second plane; and second electro-hydraulic circuit means responsive to said deviation detected by said second plurality of detectors to correct said deviation.

3. An apparatus as claimed in claim 1, wherein said machine bed has guideways therein; said first carriage includes a plurality of shoes engaging said guideways and a base attached to said plurality of shoes; and said electro-hydraulic circuit means including piston means for moving said shoes perpendicularly to said guideways.

4. An apparatus as claimed in claim 3, wherein said machine bed has two guideways parallel to said direction of rectilinear movement of said first carriage; said plurality of shoes comprise a first pair of shoes engaging a first of said guideways, said first pair of shoes being separated by said first detector flange, and a second pair of shoes engaging a second of said guideways, said second pair of shoes being separated by said first detector flange.

5. An apparatus as claimed in claim 4, wherein said means for suspending comprises a rail attached to said first detector flange and having opposite ends, each of which is connected at a single point thereof to one of said first pair of shoes; a transverse tube connected at one end thereof to said first detector flange and having adjacent the other end thereof a spherical extension; a ball socket supporting said spherical extension; and a pair of arms having first ends attached to said ball socket and extending in opposite directions parallel to said rail; the opposite ends of each of said arms being supported on one of said second pair of shoes.

6. An apparatus as claimed in claim 5, further comprising a recess formed in each of said first pair of shoes; a recess formed in each of said opposite ends of said rail in alignment with the respective said recess in said shoes; spherical balls positioned in the respective aligned recesses in said shoes and said ends of said rail; a plate spring positioned above each of said ends of said rail; and bracket means attached to each of said first pair of shoes and clamping said ends of said rail, said balls and said springs against said shoes.

7. An apparatus as claimed in claim 5, further comprising depressions formed in each of said second pair of shoes; first balls positioned in said depressions, said ends of said arms resting on said first balls; second balls resting on the top of said ends of said arms in alignment with said first balls; an angular bracket attached to each of said second pair of shoes, each of said angular brackets having a bore therein; and spring loaded means positioned within each of said bores of said angular brackets and bearing on said second balls.

8. An apparatus as claimed in claim 4, wherein said pistons means comprise first pistons mounted between each of said first pair of shoes and said first guideway for selectively moving said first pair of shoes in said first plane and perpendicular to said direction; second pistons mounted between each of said first pair of shoes and said first guideway for selectively moving said first pair of shoes perpendicular to said first plane; and third pistons mounted between each of said second pair of shoes and said second guideway for selectively moving said second pair of shoes perpendicular to said first plane.

* * * * *